United States Patent [19]
Curran

[11] Patent Number: 5,574,921
[45] Date of Patent: Nov. 12, 1996

[54] METHOD AND APPARATUS FOR REDUCING BUS NOISE AND POWER CONSUMPTION

[75] Inventor: Brian W. Curran, Saugerties, N.Y.

[73] Assignee: International Business Machines Corporation, Armonk, N.Y.

[21] Appl. No.: 468,484

[22] Filed: Jun. 6, 1995

Related U.S. Application Data

[62] Division of Ser. No. 414,554, Mar. 31, 1995.

[51] Int. Cl.$^6$ ...................................................... G06F 1/32
[52] U.S. Cl. ............................ 395/750; 326/26; 341/141
[58] Field of Search ........................... 395/750; 307/443; 326/26; 341/141

[56] References Cited

U.S. PATENT DOCUMENTS

| | | | |
|---|---|---|---|
| 4,398,106 | 8/1993 | Davidson et al. | 307/549 |
| 4,508,981 | 4/1985 | Doeler et al. | 307/542 |
| 4,594,677 | 6/1986 | Barlow | 364/578 |
| 4,644,265 | 2/1987 | Davidson et al. | 324/73 R |
| 4,811,082 | 5/1989 | Jacobs et al. | 357/80 |
| 4,857,765 | 8/1989 | Cahill et al. | 307/443 |
| 4,905,188 | 2/1990 | Chuang et al. | 395/375 |
| 5,142,167 | 8/1992 | Temple et al. | 307/443 |
| 5,148,047 | 9/1992 | Spohrer | 307/246 |
| 5,160,922 | 11/1992 | DeRosa et al. | 340/825.5 |
| 5,229,657 | 7/1993 | Rackley | 307/443 |
| 5,321,319 | 6/1994 | Mahmood | 307/443 |
| 5,337,252 | 8/1994 | Lac et al. | 364/488 |

*Primary Examiner*—Jack B. Harvey
*Assistant Examiner*—Ayaz R. Sheikh
*Attorney, Agent, or Firm*—Varnum, Riddering, Schmidt & Howlett; Lynn L. Augspurger

[57] ABSTRACT

In a computer system comprising a plurality of subsystems, interconnected by a bus comprising bit drivers and bit receivers, data words are transmitted on the bus in the form of code words. The code words are formulated such that the number of bits of the bus which changes with the transmission of successive code words is minimized. A switching code, comprising one or more bits, defines a plurality of napping codes and a data word to be transmitted is mapped by use of the mapping codes to a plurality of code words. One of the plurality of code words differing from a previously transmitted code word in the least number of bit positions is selected. The selected code words is transmitted, together with a switching code, identifying the mapping from which the transmitted code word was generated. At the receiving end of the bus, the switching code is decoded to identify the mapping used in creating the code word. Using the identified mapping, the original data word is recovered.

13 Claims, 5 Drawing Sheets

METHOD AND APPARATUS FOR REDUCING BUS NOISE AND POWER CONSUMPTION

This is a division of application Ser. No. 08/414,554 filed Mar. 31, 1995.

BACKGROUND OF THE INVENTION

1. Field of the Invention

The invention relates to data processing systems and, more particularly, to a method and apparatus for reducing noise, spikes and power consumption accompanying the transmission of data between subsystems, such as processors and memories of a data processing system.

2. Background Art

In a computer system, data is transmitted as a multi-bit data word between units such as processors and memories, by means of bus driver circuits which are particularly designed to generate output signals of sufficient power to transmit the signals over transmission lines extending between the units. One known problem that has been evident in the art is that a switching driver induces a current spike on a ground or power rail. This current spike causes voltage oscillations in the ground and power rails which are inductive and resistive by nature. The operation of other circuits connected to these rails may thus be adversely impacted. The simultaneous switching, i.e., changing from one signal state to another signal state, of several drivers aggravates the noise problem. Such noise resulting from circuit switching is generally referred to as delta-I noise.

In large-scale integrated circuitry, the internal circuit power is reduced by improvements resulting from greater integration, but the power required to drive the to transmit data between integrated circuit chips is not reduced. Further, the power-requirement for the transmission of data is increased with increases in the size of the data words. One prior art approach to reducing data transmission problems is to reduce. data traffic between a processor and a memory by the use of cache memory within the processor unit. However, cache memories increase the chip die size and cost.

A given integrated circuit chip and packaging technology can only guarantee reliable circuit operation if power budgets and noise budgets are not exceeded. Such budgets limit the number of transmission line drivers which can be switched simultaneously, which may in turn, limit the number of bits in a data word or the number of processors which can be interconnected in a multi-processor system. One prior art solution for eliminating these power and noise bottlenecks is to skew the switching times of individual bit drivers of a data transmitting bus or to reduce the switching speed of the drivers. Such techniques, however, typically have an adverse impact on system performance and do not reduce the driver power.

Most current high speed integrated circuitry uses what is known as CMOS technology whereas, historically, computer circuits have used bipolar circuits. A number of techniques which were effective to reduce current demand in bipolar circuits are not applicable to CMOS circuits. One such technique is the use of out-of-phase busses to provide noise cancellation of current spikes (delta-I noise) in memory subsystems. Coding of control busses to balance or nearly balance the number of ones is another technique. Precharging a bus to half ones and half zeros state has also been used to delta-I noise in the bipolar environment. However, none of these previous techniques are applicable in the CMOS environment.

SUMMARY OF THE INVENTION

These and other problems of the prior art are overcome in accordance with the present invention by the use of switching codes consisting of one or more bits which are calculated from, and bundled with, a data word to create a code word. The switching codes are specifically designed to minimize the number of bits which switch between the zero and one states in consecutive bus cycles. The code word, which is representative of data to be transmitted and an accompanying switching code, is generated as a function of the data word to be transmitted in the current bus cycle and the code word transmitted in the previous bus cycle. Advantageously, minimizing the number of bus bits which switch between the zero and one states, and vice versa, reduces the delta-I noise typically resulting from changes of states in the driver circuits. Additionally, power consumption is reduced in CMOS since the typical CMOS bus driver uses a very large percentage of the total chip power consumption. The steady state power consumption of the CMOS bus drivers is negligible compared to power consumption involved in switching between states.

In accordance with one aspect of the invention, error correction codes may be incorporated into the switch codes to provide for fault tolerant transmission of data. In accordance with one aspect of the invention, two or more mappings are defined which map n-bit data words (or points) in the non-redundant data space to points-in a redundant code word space. A code word consists of an n-bit word and switch bits and, therefore, the redundant code word space is larger than the nonredundant word space. A set of maximally distant mappings is derived. Each mapping is applied to an n-bit data word requiring transmission. The resulting code words represent the possible code words which could be transmitted; the code word which is minimally distant from the previous code word is selected for transmission. In this manner, the number of bus drivers to be switched may be reduced by 50% or more. Advantageously, delta-I noise and power consumption are drastically reduced. A unique inverse mapping maps code words back to the non-redundant data space such that any given code word unambiguously maps into one data word.

In accordance with one particular aspect of the invention, a first n-bit code word is transmitted on a bus interconnecting a number of subsystems of a data processing system and a plurality of mapping codes are defined. A data word to be transmitted on the bus is mapped into a plurality of n-bit code words by the use of the mapping codes. One of the n-bit code words generated by the mapping is selected and transmitted on the bus. In the selection process, each of the generated n-bit code words is compared with the code word previously transmitted on the bus and one of the generated code words which differs in the smallest number of bit positions from the previously transmitted code word is selected. Advantageously, in this fashion the number bit drivers which are required to switch between the 0 and 1 position is reduced, thereby substantially reducing the delta-I noise and power consumption.

In accordance with another aspect of the invention, a switching code identifying the mapping code used in the mapping of the data word into the n-bit code word selected for transmission is incorporated in the transmitted code word and is used in the receiving circuit to map the received code word into the original data word, as that data word existed prior to transmission.

In accordance with one particular embodiment of the invention, a data word to be transmitted is compared to a previously transmitted data word and the number of bit positions of the two data words having different values is determined. When the number of bit positions of the two data words having a different value exceeds a predetermined number, a code word is generated by applying a mapping code to the data word to be transmitted and adding a switching code. At the receiving end, the bits of the code word identified by the switching code are modified to reconstruct the transmitted data word.

In accordance with one aspect of the invention, an encoder circuit connected to an input data bus and a data transmission bus is responsive to an input data word on the input data bus and a code word transmitted on the data transmission bus to generate a code word representative of an input data word and comprising a switching code defining selected bits of the data word which have been complemented. A decoder circuit connected to the transmission bus is responsive to a code word on the but to decode the switching code and to complement the selected bits defined by the switching code.

An encoder circuit in accordance with the invention includes a mapping circuit comprising a plurality of encoding circuits each representing a unique mapping code. The mapping circuit is operative to generate a plurality of code words from a data word with each code word in accordance with the various mapping codes. A distance computation circuit generates a plurality of distance codes associated with the various code words, indicative of the number of bit positions of an associated code word which differ from corresponding bit positions of a previously transmitted code word. A compare circuit compares the distance codes and generates an output identifying a particular code word with the fewest number of bit positions which differ from the corresponding bit positions of the previously transmitted control word. A select circuit selectively gates the particular code word identified by the compare circuit to the bus for transmission to another subsystem.

BRIEF DESCRIPTION OF THE DRAWING

An embodiment of the invention is described below with reference to the drawing in which.

DETAILED DESCRIPTION

Figure 1:
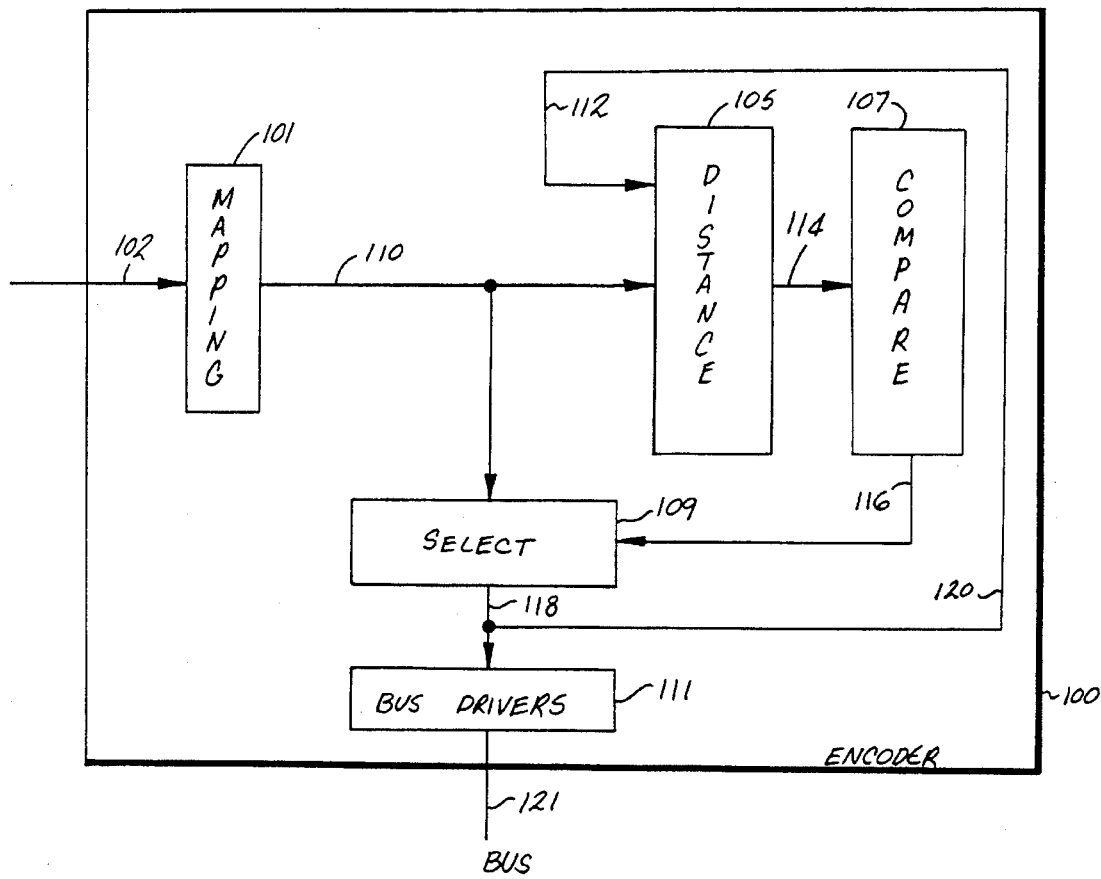
FIG. 1 is a general block diagram representation of an encoder circuit in accordance with the invention.

FIG. 1 shows an encoder circuit in which an n-bit data word is received on an internal processor bus 102 and is mapped via a mapping circuit 101 into a plurality of code words, each containing n+s bits, where s represents the number of switch bits forming part of the code word and identifying a particular mapping of the data word into the code word. The code words are transmitted via an internal bus 110 to a distance computational circuit 105. In this circuit, the Hamming distance between each of the code words on internal bus 110 and the code word which has been most recently on the bus is computed in circuit 105. The Hamming distance is defined as the number of bit positions in which two words differ. The various distance computations are transmitted via internal bus 114 to a compare circuit 107 in which they are compared. The identity of the mapping which has the smallest distance from the previous code word is transmitted via internal bus 116 to a select circuit 109. All of the mappings on bus 110 are also transmitted to select circuit 109 and one of the mappings identified on bus 116 is transmitted via internal bus 118 to a set of bus drivers 111 which transmit the code words on external bus 121. The bus drivers in the present implementation are CMOS bus drivers which are well known in the art. Such bus drivers typically consist of a push-pull driver employing complementary P and N type CMOS devices which draw large currents to charge and discharge the bus capacitance when the state of the driver is switched from off to on and visa versa. The current drawn in the steady state condition is relatively small. Accordingly, the power consumption of these devices and the delta-I noise which is generated by the switching of these devices is reduced significantly when the switching of a number of these devices is avoided in the transmission of consecutive data words over the bus. By way of example, when a data word consisting of all ones is transmitted immediately after the transmission of a data word consisting of all zeroes, all of the drivers have to be switched, causing a large current drain and large delta-I noise. In accordance with the present invention, the second data word, consisting of all ones, may be complemented such that that second data word, instead of being transmitted as all ones, is transmitted as all zeroes. A single switch bit transmitted with the data word serves to indicate whether or not the word has complemented and a decoder at the receiving end complements the received data word in accordance with the state of the switching code. In a more general case, in which the data word consists of a random arrangement of ones and zeroes, the delta-I noise may be reduced by 50 percent using a single bit switch bit.

Improvements of greater than 50% may be obtained by multiple bit switching codes. Instead of complementing an entire word as described in the previous paragraph, a plurality of mapping codes are generated, each identified by the state of the switch bits. Each mapping code is applied to the new data word and in each case, selected bits of the data word are complemented and the switch bits are appended to the resultant word to form a code word. The number of bits in the code word is equal to n+s, where n is the number of bits in the data word and s is the number of switch bits. Each of the code words is compared with a previously transmitted code word and the Hamming distance between each of the generated code words and the previously transmitted code word are computed. The code word with the lowest Hamming distance is selected and transmitted in the next bus cycle. A decoder at the receiving end decodes the switch bits and applies a reverse mapping as identified by the switch bits to recover the original data word.

An upper bound on the improvement is obtained by a maximally distant mapping code. Consider the volume of a sphere in p-dimensional space to be the number of p-dimensional points residing on or within this sphere. The entire volume of a p-dimensional space is $2^p$, since that is the total number of points in this space. Let the $2^s$ mappings of an (n, n+s) code define the origins of $2^s$ zero-radius spheres in the n+s dimensional space. The initial volume of each of these spheres is 1 since they each contain one point. Simultaneously grow the radius of these spheres until all points in the n+s dimensional space at r contained within at least one sphere. The final radius of the spheres, r is the maximum number of switching drivers since every code word in the n+s dimensional space is within a distance r of one of the mappings. The distance r must satisfy the following equation:

$$2^s \left\{ 1 + \sum_{k=1}^{r} \frac{(n+s)!}{k!(n+s-k)!} \right\} \geq 2^{(n+s)}$$

wherein $\frac{(n+s)!}{k!(n+s-k)!}$ defines the number of points which are located at exactly a distance k from a sphere origin. The equation states that the volumes of the $2^s$ spheres must be equal to or greater than the volume of the entire code space. It can be shown that for the various values of n, s, r the maximum improvement in the delta-I noise is greater than 50 percent for all cases and nearly 70 percent in certain cases.

Figure 2:
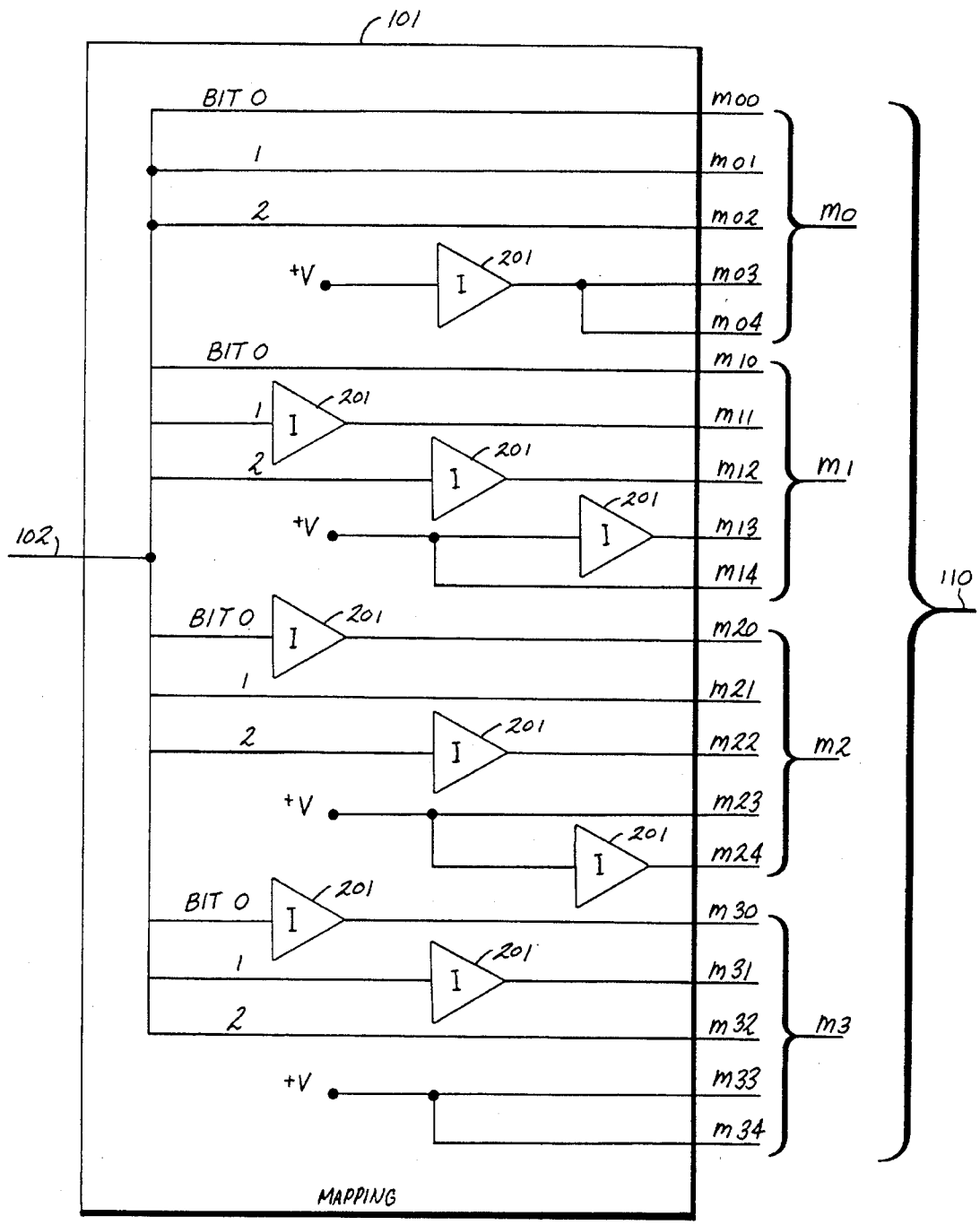
FIG. 2 is a diagrammatic representation of a particular implementation of the n-rapping circuit of FIG. 1.

FIG. 2 shows an implementation for the mapping circuit 101 in the particular case in which the data word comprises three bits and the s-code consists of two bits. The mapping circuit implements four different mappings m0, m1, m2 and m3. In the mapping m0 bits 0–2 of the three bit data word are transmitted without modification and are identified as bits m00, m01, and m02. Bits m03 and m04, representing the code 00, in this particular case, are added to form a five bit code word. The states of bits m03, m04 are derived by means of an inverter to a one connected to a voltage level, +V. Similarly, in the mapping m1, bits 1 and 2 of the data word are inverted and the s bits m13, m14 define the code 0,1 derived, as shown in FIG. 2, from the voltage source V by an inverter. In a similar fashion, in a third mapping the bits 0 and 2 of the data word are inverted and the code 1,0 is represented by bits m23 and m24. In the fourth mapping the first two bits of the data word are inverted and the code 1,1 is defined by s bits m33, m34.

Figure 3:
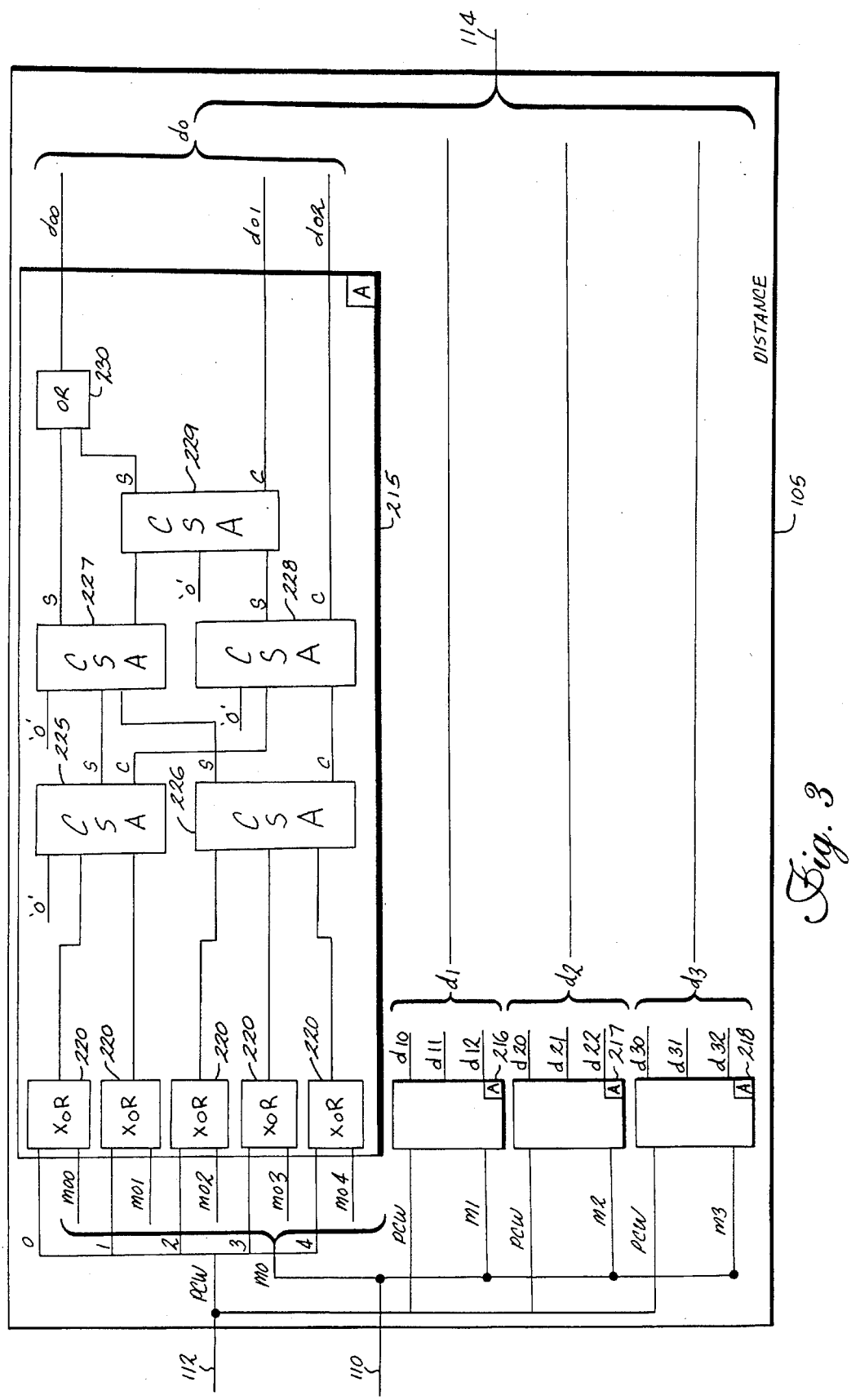
FIG. 3 is a diagrammatic representation of an implementation of a distance circuit of FIG. 1.

The four mappings are transmitted in parallel to the distance computation circuit 105 which is shown in detail in FIG. 3 for the combination of three data bits and two s bits. In addition to the four mappings transmitted to the distance computation circuit of FIG. 3, the previous code word PCW is transmitted via internal bus 120 to the distance circuit 105. Each of the five bits of the previously transmitted code word PCW is compared with the five corresponding bits of each of the mappings m0 through m3, by means of exclusive-OR circuits. Each of these circuits has a single bit output and the sum of the resultant five single bit outputs of the five exclusive-OR circuits of each comparison is computed by means of a plurality of carry-save-adders. Three-bit output words represent the binary equivalent of the hamming distance between two code words. With reference to FIG. 3, bit 0 of the previous code word and of the mapping m0 are compared by means of one of the exclusive-OR circuits 220. The comparison of bits 0 and 1 are applied to carry-save adder (CSA) 225. The comparisons of bits 2, 3 and 4 are applied to CSA 226. The sum outputs of CSA 225 and 226 are applied to CSA 227 and the carry outputs of the CSA 225 and 226 are applied to CSA 228. The carry output of CSA 227 and the sum output of CSA 228 are applied to CS,& 229. The sum output of 229 is applied together with the sum output of CSA 227 to an OR circuit 230 to form the most significant bit d00 of the output word representing a numerical value of the distance between the previous code word and the first mapping. The carry output of CSA 229 represents the second digit d01 and the carry output of CSA 228 represents the third digit d02 of the distance word. The circuit 215 is replicated in circuits 216, 217 and 218. In circuit 216 the distance between the previous code word and the second mapping m1 is computed. In circuits 217 and 218 the distances between the previous code word and the mappings m2 and m3, respectively, are computed.

Figure 4:
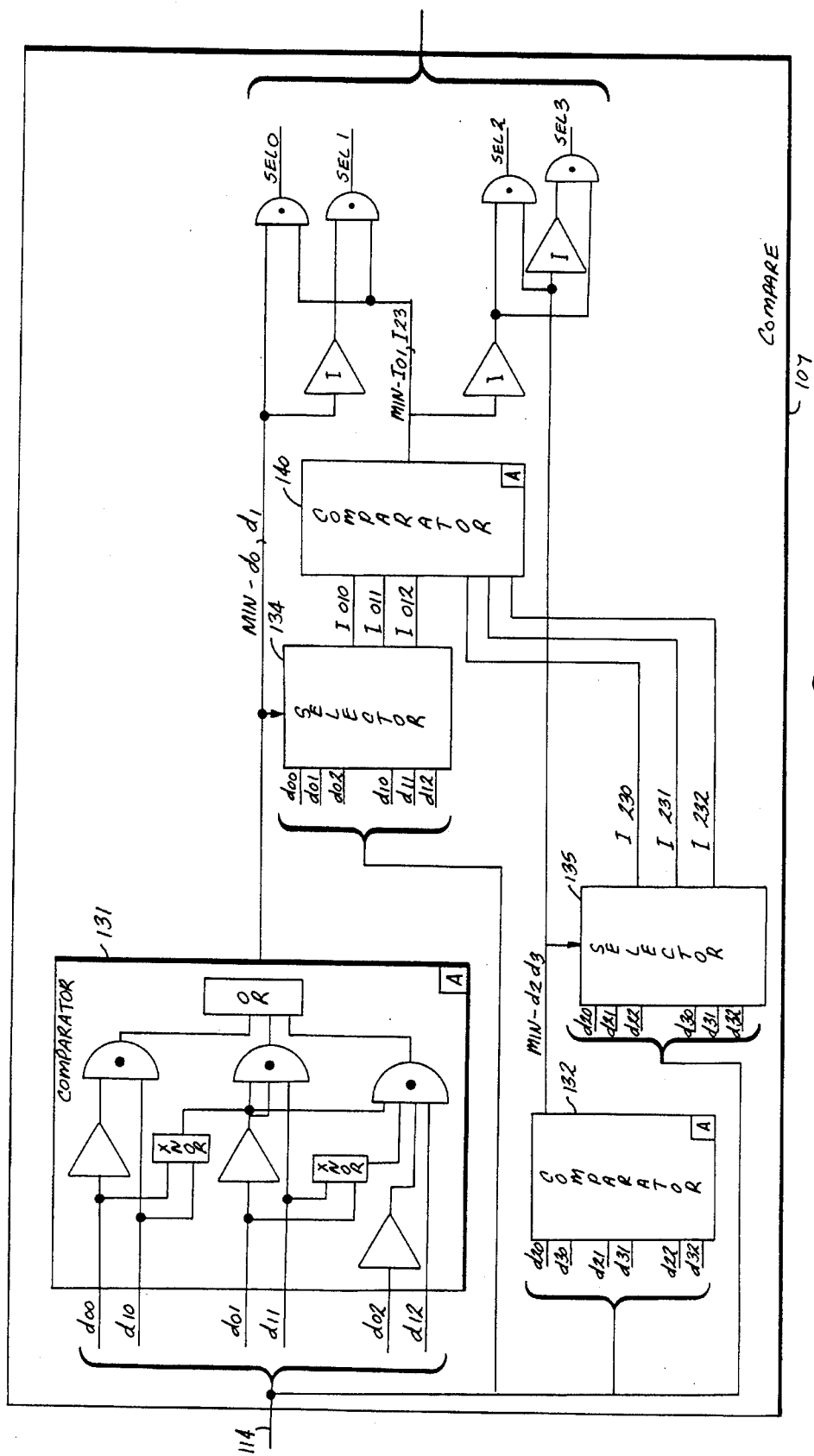
FIG. 4 is a diagrammatic representation of a compare circuit of FIG. 1.

The four separate data words representing distances are compared by 10 means of comparator 107 and the smallest of these, representing a minimum distance of one of the mappings from the previous code word is determined by means of compare circuit 107. FIG. 4 shows an implementation of the compare circuit 107 for the case of a 3 bit data word and a 2 bit s-code. As shown in FIG. 4, the distance bits d00 through d32, generated in the distance computation circuit 105, are applied to comparators 131, 132. Each comparator generates a binary output signal indicating which of two input words has the smaller value. More specifically, the circuit 131 generates a logical 1 output when distance word 0 is smaller than distance word 1 and circuit 132 generates a logical 1 output when distance word 2 is smaller than distance word 3. The bits defining distance word 0 and distance word 1 are applied as inputs to a standard selector circuit 134 and the output of the comparator circuit 131 is applied as a control input to selector 134. This circuit selectively gates the bits d00 through d02 to its outputs I010, I011 and I012 when distance word zero is smaller than distance word 1. When distance word 1 is than distance word zero, the selector 134 gates bits d10 through d12 onto its outputs. Thus, the outputs of selector 134 represent the smaller of distance word zero and distance word 1. In similar fashion, distance word 2 and distance word 3 are compared in comparator 132 which has the same logical structure as comparator 13 1 and selector 135 functions in a manner identical to selector 134 and provides outputs 1230 through 1232 representing the smaller of the third and fourth distance words. The outputs of selectors 134 and 135 are compared by means of comparator 140 which has the same logical structure as comparator 131. The output of comparator 140 is a logical 1 when the distance word identified by the outputs of selector 134 is smaller than the distance word identified by the outputs of selector 135. It will be apparent that the output of comparator 131 represents the minimum of the first and second data words, that the output of comparator 132 represents the minimum of the third and fourth data words and the output of comparator 140 represents the minimum of the smaller of data words 0, 1 and data words 2, 3. The compare circuit 107 generates four select control leads SEL 0 through SEL 3. SEL 0 is activated when the first distance word d0 is smaller than the distance word d 1 and d0 is smaller than the smaller of distance words d2 and d3. In a similar fashion, SEL 1 is activated when distance word 1 is smallest, SEL 2 is activated when distance word 2 is smallest and SEL 3 is activated when distance word 3 is smallest. The four selector leads SEL 0 through SEL 3 are applied via conductors 116 to the select circuit 109. Each of the mappings are applied from internal bus 110 to the select circuit 109 and the mapping identified by select leads SEL through SEL 3 is applied to the bus drivers 111, shown in FIG. 1. The select circuit 109 is a standard select circuit which is well known in the art.

Figure 5:
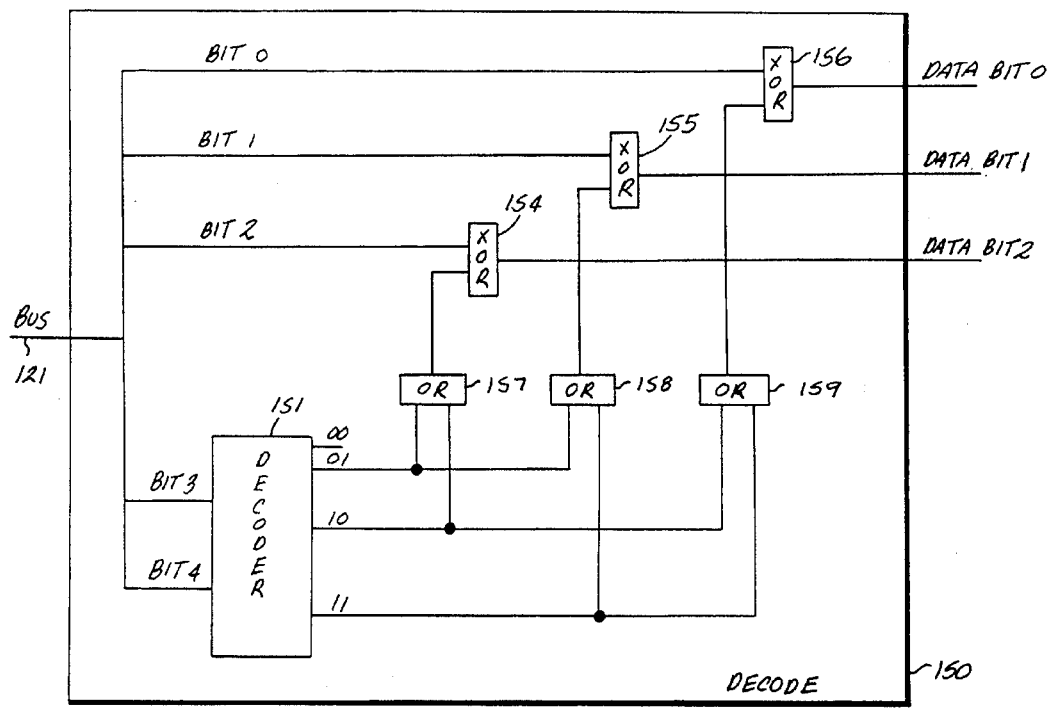
FIG. 5 is a diagrammatic representation of a decoder circuit for decoding a word at the receiving end of the bus.

FIG. 5 is a block diagram representation of a decoder such as is connected to the-bus 121 at the receiving end. The decoder 150 is a block diagram representation of a decoder for a particular configuration of three data bits and two switch bits. A selected one of the mappings M0 through M3, shown in FIG. 2, is transmitted on bus 121 and bits 3 and 4, representing the switching bits, are decoded by means of a standard well known decoder circuit 151 to provide a binary indication of the identity of the mapping. In the decoder 150, the received bits 0 through 2 are modified in a manner which is the inverse of the mappings depicted in FIG. 2. In the event that the transmitted mapping is M0, bits 0 through 2 are transmitted through the decoder 150 without modification and become output data bits 0 through 2 of the decoder 150. In the event that mapping M1 is chosen, both bits 1 and 2 of the data word are inverted by means of exclusive OR circuits 154, 155. Bit 0 is inverted via exclusive-OR circuit 156 when the M2 or M3 mappings are selected. The decoder outputs are connected to OR circuits 157, 158, 159 to selectively activate a corresponding exclusive-OR circuit when a particular bit is to be inverted.

Figure 6:
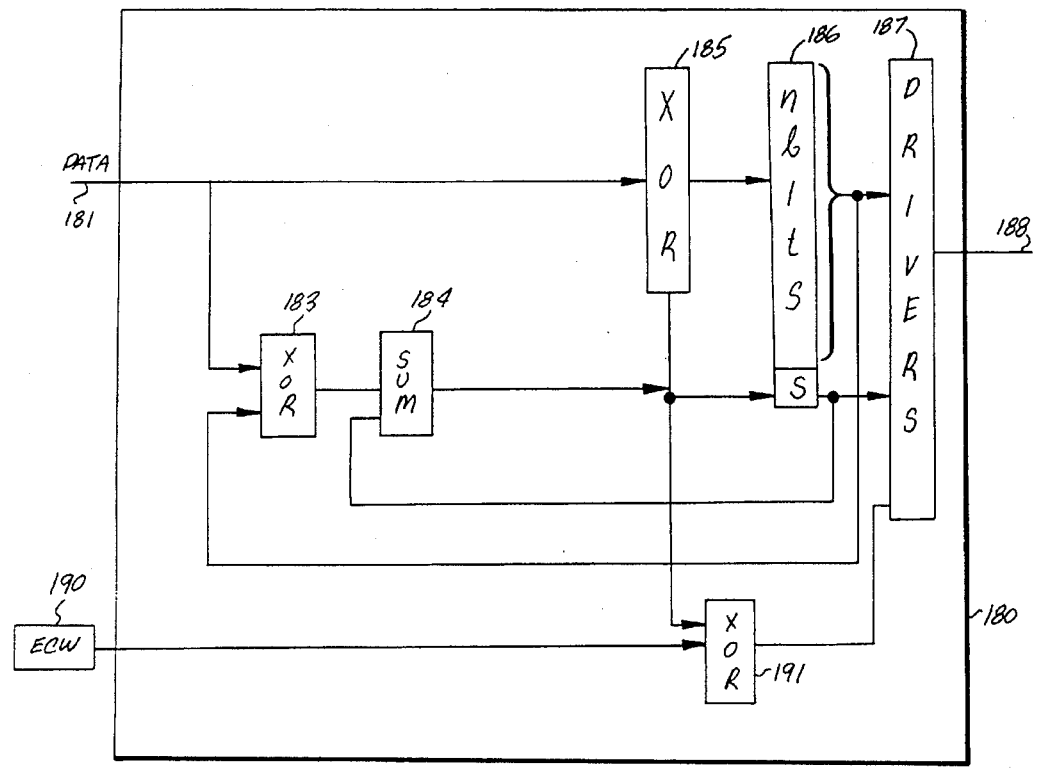
FIG. 6 is a block diagram representation of an alternate embodiment of an encoder circuit in accordance with the invention.

The complexity of the encoder 100 of FIG. 1 can be simplified in the special case where there is only one switch bit and S is equal to 1. FIG. 6 is a diagrammatic representation of such a simplified encoder. In that case, there are only two mappings, e.g., an all zeroes mapping by which the data word is unchanged and an all ones mapping by which all bits of the data word are inverted. Only one distance has to be computed. In circuit 180 of FIG. 6, an N bit data word on input bus 181 is compared on a bit-by-bit basis with the data bits of the previously transmitted code word on bus 182, in exclusive-OR circuit 183. The results of the bit-by-bit comparison of the two N bit words are added by means of a standard summing circuit 184 constructed in a manner similar to the circuit 215 of FIG. 3. The circuit 184 generates an output indicative of the number of bits of the new data word which differ from the data bits of the previously transmitted code word. If the sum is greater than one-half of the total number of data bits, an output signal generated by the sum circuit 184 is applied to the exclusive-OR circuit 185 causing all bits of the new data word to be complemented. Furthermore, in that case, a 1 is transmitted in the position of the s bit of the code word in register 186 and the data bits of the code word together with the s bit are transmitted via drivers 187. In the event that the number generated by sum circuit 184 is less than half of the total number of bits of the data word, the data word is not complemented and a zero is transmitted in the S bit position with the data word. The outputs of the bus drivers are transmitted via bus 188 to a receiving circuit. The receiving circuit will have a decode circuit similar to the code circuit 150 of FIG. 5 which causes the data bits of the code word to be complemented in case the switching bit S is a 1.

FIG. 6 further shows a provision for the use of the present invention in association with an error control word. FIG. 6 shows an error control with generator 190 which is a well-known device. The error control word generator generates a multi-bit word representing parity over a number of bits of a data word and generally has a of bits equal to the number of bytes in the data word. The output of the sum circuit 184, representing the switch bit, is incorporated in the error control word by means of exclusive OR circuit 191. The output of circuit 191 is connected to the drivers 187 and the modified error control word is transmitted to the receiving end via bus 188, as described above. At the receiving end, standard error control circuitry will compute the error syndrome over all of the received bits. In a standard fashion, the error syndrome is compared to entries of an H-error control matrix. One or more additional columns may be added to the H matrix to accommodate one or more of the s bits. In a simpler case where only parity is computed over an entire word, the s bit output of sum circuit 184 may be used to complement the parity bit. At the receiving end, the parity bit will again be complemented depending upon the state of the s bit.

It will be understood that the above-described arrangements are merely illustrative of applications of the principles of the invention and that other arrangements may be devised by those skilled in the art without departing from the scope of the invention as defined by the appended claims.

It will be understood that the above-described embodiment is only illustrative of the principles of the invention and that other embodiments may be devised by those skilled in the art without departing from the scope of the invention as defined by the appended claims.

What we claim is:

1. In a data processing system comprising a plurality of subsystems interconnected by a bus comprising a plurality of bit drivers and bit receivers, a method of transmitting data from a sending subsystem to a receiving subsystem comprising the steps of:

transmitting a first n-bit code word on the bus from the sending subsystem;

mapping a predefined data word comprising a predetermined number of data bits into a plurality of second n-bit code words by use of a plurality of predefined mapping codes, each of the second n-bit code words being generated from the predetermined number of data bits of the data word;

selecting one of the plurality of second n-bit code words; and transmitting the selected n-bit code word on the bus from the sending subsystem.

2. The method in accordance with claim 1 and wherein the step of selecting comprises comparing at least one of the second n-bit code words with the first n-bit code word.

3. The method in accordance with claim 2 wherein the step of comparing comprises bitwise comparing the first n-bit code word to at least one of the second n-bit code words.

4. The method in accordance with claim 2 wherein the step of selecting comprises comparing the first n-bit code word with a plurality of the second n-bit code words and selecting one of the second n-bit code words which differs from the first n-bit code word in the smallest number of bit positions.

5. The method in accordance with claim 1 and further comprising the step of receiving the selected one of the second n-bit code words from the bus in the receiving subsystem and the step of mapping the received second n-bit code word into the predefined data word.

6. The method in accordance with claim 5 wherein the step of transmitting the selected n-bit code word further comprises transmitting a switching code identifying one of the mapping codes and the step of mapping the received second n-bit code word further comprises using the transmitted switching code in the step of mapping the received second n-bit word into the predefined data word.

7. In a data processing system comprising a plurality of subsystems interconnected by a bus comprising a plurality of bit drivers and bit receivers, a method of transmitting data words on the bus from a sending subsystem to a receiving subsystem comprising the steps of:

transmitting a first data word comprising n bit positions from the sending subsystem;

generating a second data word comprising n bit positions;

comparing the first and second data words and determining number of bit positions of the first and second data words having different values;

generating a modified data word by applying a predefined mapping code to the second data word and modifying selected bits of the second data word when the number of bit positions of the first and second data words having different values exceeds a predetermined number;

generating a switching code identifying the selected bits;

appending the switching code to the modified data word to generate a code word;

transmitting the code word from the sending subsystem to the receiving subsystem;

receiving the code word at the receiving subsystem and modifying the bits of the code word identified by the switching code to reconstruct the second data word.

8. The method in accordance with claim 7 wherein the step of generating a modified data word comprises complementing the selected bits.

9. The method in accordance with claim 8 wherein the predetermined number is n/2.

10. In a data processing system comprising a plurality of subsystems interconnected by a bus comprising a plurality of bit drivers and bit receivers, a method of transmitting data words on the bus comprising the steps of:

transmitting a previous code word from one Subsystem to another subsystem;

providing a n-bit data word;

providing a plurality of mapping codes each having n bits;

providing a plurality of switching codes, each uniquely identifying one of the plurality of the mapping codes;

applying each of the mapping codes individually to the n-bit data word;

selectively modifying bits of the data word in accordance with each applied mapping code to generate a plurality of new code words, each new code word incorporating one of the switching codes identifying an applied mapping code;

individually comparing each of the new code words with the previous code word and identifying one of the new code words differing from the previous code word in the fewest bit positions;

transmitting the identified one of the new code words from the one subsystem to the other subsystem;

receiving the identified one of the new code words at the other subsystem; and selectively modifying the bits of the received identified one of the new code words in accordance with the mapping identified by one of the switching codes incorporated in the received identified one of the new code words to reconstruct the n-bit data word in the other subsystem.

11. The method in accordance with claim 10 wherein the step of comparing comprises the step of identifying each of the bits in a bit position of each the new code words which differs from a bit in a corresponding bit position of the previous code word, and generating a plurality of distance outputs, each distance output indicative of the number of bits in a new code word which differ from bits in corresponding positions of the previous code word.

12. The method in accordance with claim 11 wherein the step of comparing further comprises the step comparing the distance outputs and generating a select output identifying a new code word differing from the previous code word in the fewest bit positions.

13. The method in accordance with claim 11 and further comprising the step of generating an error control code for the identified one of the new code words and wherein the step of transmitting includes transmitting the error control word.

* * * * *